(12) United States Patent
Majer et al.

(10) Patent No.: US 7,382,374 B2
(45) Date of Patent: Jun. 3, 2008

(54) COMPUTERIZED METHOD AND COMPUTER SYSTEM FOR POSITIONING A POINTER

(75) Inventors: Peter Majer, Zürich (CH); Christoph Laimer, Zürich (CH)

(73) Assignee: Bitplane AG, Zurich (CH)

( * ) Notice: Subject to any disclaimer, the term of this patent is extended or adjusted under 35 U.S.C. 154(b) by 193 days.

(21) Appl. No.: 11/118,363

(22) Filed: May 2, 2005

(65) Prior Publication Data

US 2006/0244745 A1 Nov. 2, 2006

(51) Int. Cl.
*G06T 15/10* (2006.01)
*G06T 13/00* (2006.01)
*G06T 15/70* (2006.01)

(52) U.S. Cl. .................. 345/473; 345/427; 345/952
(58) Field of Classification Search ............. 345/427, 345/473; 715/851–852, 858
See application file for complete search history.

(56) References Cited

U.S. PATENT DOCUMENTS

| | | | |
|---|---|---|---|
| 4,607,255 A | | 8/1986 | Fuchs et al. |
| 5,298,919 A | * | 3/1994 | Chang ................... 345/163 |
| 5,422,987 A | * | 6/1995 | Yamada .................. 345/427 |
| 5,473,344 A | * | 12/1995 | Bacon et al. ............ 345/163 |
| 5,574,836 A | * | 11/1996 | Broemmelsiek .......... 345/427 |
| 5,608,850 A | * | 3/1997 | Robertson ............... 345/427 |
| 5,636,036 A | * | 6/1997 | Ashbey .................. 386/8 |
| 5,751,927 A | | 5/1998 | Wason |
| 5,798,761 A | * | 8/1998 | Isaacs ................... 345/419 |
| 5,924,870 A | * | 7/1999 | Brosh et al. ............ 434/365 |
| 5,986,675 A | * | 11/1999 | Anderson et al. ........ 345/473 |
| 6,023,275 A | * | 2/2000 | Horvitz et al. .......... 715/700 |
| 6,057,827 A | | 5/2000 | Matthews |
| 6,097,393 A | * | 8/2000 | Prouty et al. ........... 345/419 |
| 6,184,876 B1 | * | 2/2001 | Miller ................... 715/235 |

(Continued)

FOREIGN PATENT DOCUMENTS

WO     WO 00/60442     10/2000

OTHER PUBLICATIONS

Ballard "Eye Fixation And Early Vision: Kinetic Depth" IEEE, % (Dec. 5, 1988), pp. 524-531, XP010225224 the whole document.

*Primary Examiner*—Mark Zimmerman
*Assistant Examiner*—Crystal Murdoch
(74) *Attorney, Agent, or Firm*—Oliff & Berridge, PLC (57) ABSTRACT

In a visualization system a three-dimensional scene (43) is projected onto a camera's view projection plane (42) from a camera's defined viewpoint (41) and mapped onto a two-dimensional display. For positioning a pointer (45) in the three-dimensional scene (43), the view of the three-dimensional scene is animated automatically to provide to a user the view of the three-dimensional scene with a kinetic depth effect. The view of the three-dimensional scene is animated by applying a spatial transformation to the three-dimensional scene (43) or the camera. The transformation is applied to the three-dimensional (43) scene or the camera such that the projected view of the pointer (45) remains essentially static. The pointer (45) is positioned based on signals received from the user, while the view is animated. Providing to the user an animated view of the three-dimensional scene with a kinetic depth effect makes it possible for the user to place the pointer (45) in all three dimensions without the need for stereoscopic vision.

21 Claims, 9 Drawing Sheets

U.S. PATENT DOCUMENTS

| | | | |
|---|---|---|---|
| 6,252,974 B1* | 6/2001 | Martens et al. | 382/107 |
| 6,348,924 B1* | 2/2002 | Brinsmead | 345/441 |
| 6,377,256 B1 | 4/2002 | Light et al. | |
| 6,384,820 B2* | 5/2002 | Light et al. | 345/419 |
| 6,529,210 B1* | 3/2003 | Rees | 345/654 |
| 6,774,914 B1* | 8/2004 | Benayoun | 345/650 |
| 6,819,344 B2* | 11/2004 | Robbins | 715/848 |
| 6,828,962 B1* | 12/2004 | McConkie et al. | 345/419 |
| 6,833,828 B1 | 12/2004 | Wininger | |
| 6,981,229 B1* | 12/2005 | Balakrishnan et al. | 715/863 |
| 7,095,409 B2* | 8/2006 | Cook et al. | 345/426 |
| 7,119,819 B1* | 10/2006 | Robertson et al. | 715/782 |
| 7,133,041 B2* | 11/2006 | Kaufman et al. | 345/419 |
| 7,278,115 B1* | 10/2007 | Conway et al. | 715/838 |
| 2001/0046896 A1 | 11/2001 | Miyamoto et al. | |
| 2002/0140698 A1* | 10/2002 | Robertson et al. | 345/427 |
| 2003/0219146 A1* | 11/2003 | Jepson et al. | 382/103 |
| 2004/0249303 A1* | 12/2004 | Serra | 600/545 |
| 2005/0057497 A1* | 3/2005 | Kawahara | 345/157 |
| 2005/0093824 A1* | 5/2005 | Hinckley et al. | 345/163 |
| 2005/0204306 A1* | 9/2005 | Kawahara et al. | 715/782 |
| 2006/0048076 A1* | 3/2006 | Vronay et al. | 715/850 |
| 2006/0176273 A1* | 8/2006 | Wolfe | 345/156 |

\* cited by examiner

COMPUTERIZED METHOD AND COMPUTER SYSTEM FOR POSITIONING A POINTER

FIELD OF THE INVENTION

The present invention relates to a computerized method and a computer system for positioning a pointer in a three-dimensional scene. Specifically, the present invention relates to a computerized method and a computerized visualization system for positioning in a visualization system a pointer in a three-dimensional scene, a view of the three-dimensional scene being shown on a two-dimensional display.

BACKGROUND OF THE INVENTION

Computerized visualization systems are used in many fields such as computer gaming, three-dimensional modeling, and advanced scientific visualization, for example digital microscopy. Typically, computerized visualization systems use camera models with central or parallel projection for obtaining images from input data defining three-dimensional scenes. Images are obtained by projecting three-dimensional objects onto a view (projection) plane (or view port) and then mapping the view plane onto a two-dimensional display. In a camera model with central projection, projection lines emanate from the center of projection, the defined viewpoint. Images are obtained by parallel projection with camera models having the viewpoint set at an infinite distance from the view projection plane. The intersection of the projection lines with the view projection plane forms the projected two-dimensional image of the three-dimensional object. Thus a three-dimensional scene is shown on the two-dimensional display as projected onto the camera model's view projection plane from the camera model's defined viewpoint. The representation of the three-dimensional scene on the two-dimensional display lacks indication of depth and distance. Particularly, in three-dimensional scenes comprising numerous objects of unknown shape or size, a user is left without any visual cues for depth perception. Consequently, it is very difficult for a user to place a pointer, i.e. a cursor, in a three-dimensional scene. Hereafter, the camera model of a computerized visualization system, defined by its view projection plane and viewpoint, is also referred to as "camera".

In U.S. Pat. No. 6,057,827 a computer graphics modeling system is described which makes it possible for a user to position a cursor accurately on a geometric point of a three-dimensional object. According to U.S. Pat. No. 6,057,827, in response to a user signal, the cursor is moved automatically to the geometric point of the three-dimensional object nearest to the present position of the cursor. Nevertheless, without any additional visual cues, the user is still required to move the cursor to a close proximity of the three-dimensional object while the user receives no visual cues for the depth positioning of the cursor.

An improved depth perception can be achieved by adding means for stereoscopic vision to the visualization system. However, not all users are able to obtain an improved depth perception from stereoscopic vision. Moreover, hardware devices, such as binoculars or filtering glasses, required for obtaining the stereoscopic vision, are often found impractical or inconvenient by the users.

SUMMARY OF THE INVENTION

It is an objective of this invention to provide a computerized method and a computer system for positioning in a visualization system a pointer in a three-dimensional scene, which method and system do not have at least some of the disadvantages of the prior art. In particular, it is an objective of the present invention to provide a computerized method and a computerized visualization system for positioning a pointer in a three-dimensional scene, which method and system provide to a user a perception of depth when viewing the three-dimensional scene shown in a two-dimensional display. It is a further objective of the present invention to provide a computerized method and a computerized visualization system for positioning a pointer in a three-dimensional scene, which method and system provide to a user an improved perception of depth without the need of hardware devices for stereoscopic vision.

According to the present invention, these objectives are achieved particularly through the features of the independent claims. In addition, further advantageous embodiments follow from the dependent claims and the description.

According to the present invention, the above-mentioned objectives are particularly achieved in that, for positioning in a computerized visualization system a pointer (cursor) in a three-dimensional scene, a view of the scene being shown on a two-dimensional display, the view of the three-dimensional scene is animated automatically to provide to a user the view of the three-dimensional scene with a kinetic depth effect. While animating the view, signals, indicating positioning values for three dimensions, are received from the user. For example the positioning values can be specified in the display's two dimensions and a depth dimension vertical to the display. Responsive to the signals, the pointer is positioned based on the positioning values while the view is animated. Providing to the user an animated view of the three-dimensional scene makes it possible for the user to view the three-dimensional scene with perception of depth. This so-called kinetic depth effect was described in 1953 by H. Wallach and D. N. O'Connell, "The Kinetic Depth Effect", Journal of Experimental Psychology, 45, 205-217.

While the animated view of the three-dimensional scene is provided to the user, user signals are received and the pointer is positioned accordingly. Consequently, it is possible for the user to place the pointer in the three-dimensional scene not only in two but also in three dimensions. For example, the user can place the pointer in the display's two dimensions and also in the depth dimension vertical to the display's two dimensions. Defining the position for placing the pointer in the three-dimensional scene is possible by means of conventional entry devices such as a mouse with a scrolling wheel.

Providing to the user an animated view of the three-dimensional scene with a kinetic depth effect makes it possible for the user to place the pointer in all three dimensions without having to perform any further operations, e.g. there is no need for the user to select manually select alternative views. There is also no need for the user to use additional devices for stereoscopic vision. Providing to the user an automatically animated view of the three-dimensional scene with a kinetic depth effect also enables users without ability for stereoscopic vision to perceive depth. Furthermore, animating the view of the three-dimensional scene makes it possible to produce a kinetic depth effect in systems using central projection as well as in systems using parallel projection.

Preferably, the view of the three-dimensional scene is shown on the two-dimensional display as projected onto a camera's view projection plane from a defined viewpoint of the camera. The view of the three-dimensional scene includes a view of the pointer as projected onto the view projection plane from the viewpoint. Animating the view of the three-dimensional scene includes applying a transformation to the three-dimensional scene or the camera. The transformation is applied such that the view of the pointer remains essentially static. In other words, the projection of the pointer, defined by an intersection of a projection line (running through the viewpoint and a current location of the pointer) with the view projection plane, is kept fixed. Thus, for positioning the pointer, the user profits from an improved depth perception of the three-dimensional scene without being handicapped by movement of the pointer.

Preferably, the transformation includes one of rotation and shearing, the rotation being performed about a rotation axis running through a current location of the pointer, and the shearing being performed along a shearing plane running through the current location of the pointer. For providing to the user an animated view of the three-dimensional scene with an optimal kinetic depth effect, the rotation axis or the shearing plane, respectively, is essentially parallel to the view projection plane.

Applying a rotation transformation to the three-dimensional scene or the camera changes the relative positioning of the camera and the three-dimensional scene. In other words, applying a rotation transformation to the three-dimensional scene or the camera has the effect of moving the three-dimensional scene relative to the camera or moving the camera relative to the three-dimensional scene, respectively. When changing the relative positioning of the camera and the three-dimensional scene, the relative positioning of the camera's viewpoint and the camera's view projection plane is changed with respect to the three-dimensional scene while the viewpoint remains fixed relative to the view projection plane. Thus, when changing the relative positioning of the camera and the three-dimensional scene, either the positions of the viewpoint and the view projection plane are changed relative to the three-dimensional scene or the positions of objects of the three-dimensional scene are changed relative to the viewpoint and the view projection plane.

Performing the rotation transformation about an axis running through a current location of the pointer and performing the shearing transformation about a (shearing) plane running through the current location of the pointer have the advantage that the location of the pointer is not affected by the transformation. Consequently, the representation (view) of the pointer in the two-dimensional display does not move as a result of the transformation. Thus, for positioning the pointer, the user is not disturbed by unexpected pointer movement.

Applying a shearing transformation to the three-dimensional scene or the camera has the effect of changing the perspective view of the three-dimensional scene. Preferably, the shearing transformation is applied to the three-dimensional scene; however, the shearing transformation can also be applied to the camera by altering correspondingly the positions of the viewpoint and the view projection plane relative to the shearing plane. Compared to animating the view of the three-dimensional scene by means of a rotation transformation, animating the view by means of a shearing transformation results in an animated view of the three-dimensional scene that appears more stable to a user.

In another preferred embodiment, the view is animated continuously in a defined movement with cyclic repetition. A continuously repeated movement pattern makes it possible to familiarize the user with the three-dimensional characteristics of the scene shown on the display, i.e. the user is getting used to the depth aspects of the three-dimensional scene. A smooth, uniformly continuous animation of the view makes it easier for the user to perceive the kinetic depth effect than a discontinuous, erratic animation of the view.

In a further preferred embodiment, the view is animated continuously in a back-and-forth pivoting movement about a current location of the pointer at a defined speed and with a defined pivot angle. For example, the pivot angle is selected in the range of 3 to 6 degrees. For example, the pointer is represented by a three-dimensional cursor and the pivot point is located inside the cursor. Animating the view in a continuous back-and-forth pivoting movement about the pivot point causes the representation of the three-dimensional scene to appear in the two-dimensional display, as if the user was pivoting his head back and forth in the display's horizontal or vertical dimension. Placing the pivot point at the current location of the pointer has the advantage that a projection of the pointer onto the view projection plane remains fixed in the view projection plane. Consequently, the representation (view) of the pointer in the two-dimensional display does not move as a result of the movement of the camera or the three-dimensional scene, respectively. Thus, for positioning the pointer, the user is not disturbed by pointer movement occurring automatically and independently of the user's position signals.

In addition to a computerized method and a computerized visualization system for positioning a pointer in a three-dimensional scene shown on a two-dimensional display, the present invention also relates to a computer program product including computer program code means for controlling one or more processors of a computer, particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE
PREFERRED EMBODIMENTS

Figure 1:
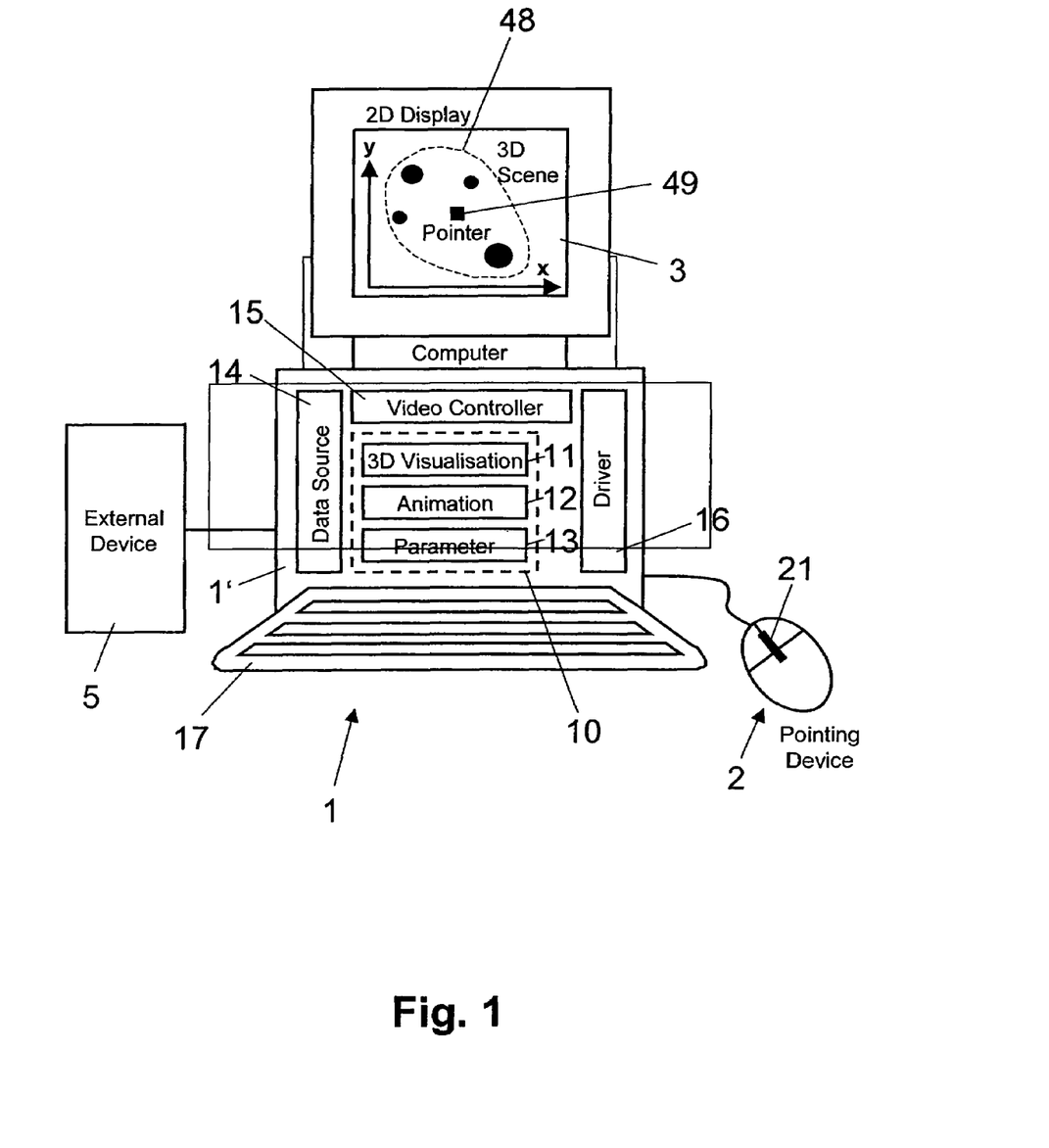
FIG. 1 shows a block diagram illustrating schematically an exemplary configuration of a computerized visualization system with a display and a pointing device attached thereto.

In FIG. 1, reference numeral 1 refers to a computerized visualization system. As is illustrated in FIG. 1, the computerized visualization system includes a computer 1', connected to a two-dimensional display 3, a pointing device 2, for example a mouse, a track ball or a touch pad, and a keyboard 17. The computer 1' is provided with one or more processors and is implemented as a personal computer, for example. The pointing device 2 makes it possible for a user to provide to the computer 1' signals for positioning values. Preferably, the pointing device 2 is provided with means, for example a scrolling wheel 21, for providing to the computer 1' not only signals for positioning values in the two dimensions of display 3, but also in the depth dimension (vertical to the two dimensions of the display 3). Alternatively, a signal for the depth dimension (and the two dimensions of the display 3) can be provided to the computer 1' by means of the keyboard 17, for example. In an embodiment, the computerized visualization system 1 includes a common housing supporting the computer 1', the two-dimensional display 3, the pointing device 2, and/or the keyboard 17. For example, the computerized visualization system 1 is configured as a mobile portable device such as a laptop, notebook or palmtop computer, or as a personal data assistant (PDA) or a mobile radio telephone.

As is illustrated in FIG. 1, the computer 1' includes a driver 16 for the pointer device 2. The driver 16 is configured to receive pointing signals from the pointing device 2 (and/or from the keyboard 17) and to generate positioning values for the two dimensions of display 3, the x and y coordinates, and for the depth dimensions, the z coordinate. One skilled in the art will understand that the pointing signals provided by the pointing device 2 (or by alternative means) are not limited to positioning the pointer relative to the three dimensions (x, y, z) of a coordinate system defined by the display 3, but can be used alternatively for positioning the pointer relative to the three dimensions (u, v, w) of a coordinate system defined for a three-dimensional scene to be displayed on display 3. In another embodiment the three-dimensional pointing signals are generated from the two-dimensional signals of a pointing device such as a computer mouse by a driver that automatically determines a positioning value for the third dimension. The driver determines the positioning value for the third dimension for example from the two-dimensional signal and the three-dimensional scene by selecting that positioning value for the third dimension which in some sense is a best value out of all the possible values along the line of view.

The computer 1' also includes a conventional video controller 15, for example a video card, for controlling display 3.

In FIG. 1, reference numeral 14 refers to a data source. The data source is representative for data memory, a programming interface, or a hardware interface providing input data, which defines a three-dimensional scene to be displayed on display 3. Typically, the input data defines the three-dimensional scene on the basis of one or more three-dimensional objects, each object being defined by its shape, size, and position. For example, the input data is received from an external device 5 connected to the computer 1' such as a data store, a video camera, or a digital microscope. The input data may also be received from an application program such as a computer game, a computer aided design or modeling program, or an advanced scientific visualization program such as a digital microscopy application. The input data may be provided in different formats such as a stack of 2D-TIFF-Files (Tagged Image File Format), or a VRML-File (Virtual Reality Modeling Language) with object coordinates.

In FIG. 1, reference numeral 10 refers to functional modules driving the visualization system: a 3D visualization module 11, an animation module 12, and a parameter module 13. The functional modules 10 are implemented preferably as programmed software modules stored on a computer readable medium, connected fixed or removable to the processor(s) of the computer 1'. One skilled in the art will understand, however, that the functional modules 10 can also be implemented fully or in part by means of hardware.

Figure 2A:
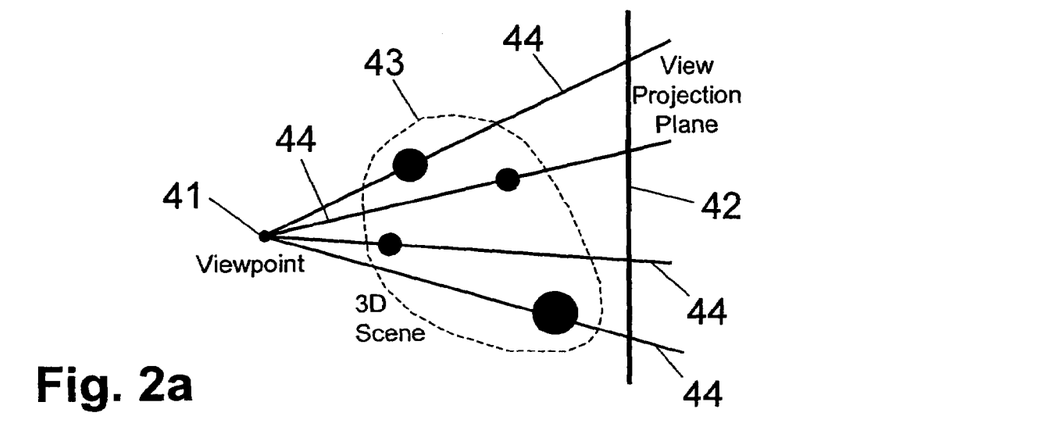
FIGS. 2a, 2b, and 2c show top views illustrating schematically the projection of objects in a three-dimensional scene from a viewpoint onto a view projection plane, the three-dimensional scene being arranged between the viewpoint and the view projection plane, objects of the three-dimensional scene being arranged on both sides of the view projection plane, or the view projection plane being arranged between the viewpoint and the three-dimensional scene, respectively.
Figure 2B:
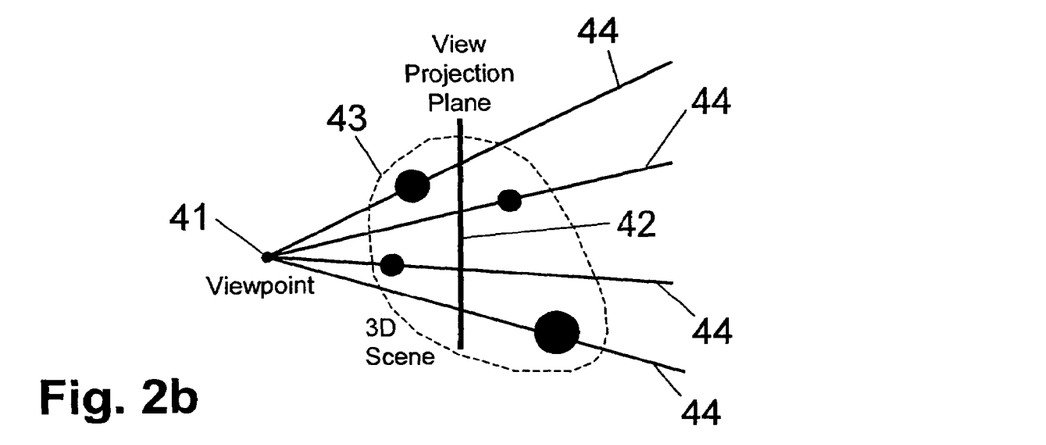
Figure 2C:
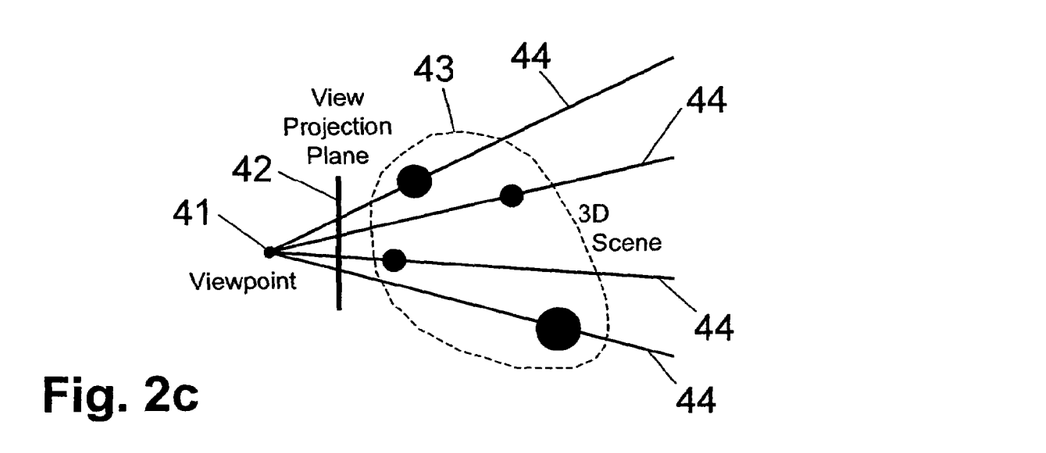

The 3D visualization module 11 includes software functions for implementing a camera model defined by its view projection plane and viewpoint. In other words, the 3D visualization module 11 includes software functions for projecting the three-dimensional objects included in the three-dimensional scene onto the camera's view projection plane as seen from the camera's defined viewpoint. As is illustrated in FIGS. 2a, 2b, and 2c, the three-dimensional objects included in the three-dimensional scene 43 are projected onto the view projection plane 42 by projection lines 44 emanating from the viewpoint 41. The intersection of the projection lines 44 with the view projection plane 42 forms the projected two-dimensional image of the three-dimensional scene 43 and its three-dimensional objects. The viewpoint 41 and the view projection plane 42 form a camera, wherein the view projection plane 42 and the viewpoint 41 can be defined such that the three-dimensional scene 43 is located between the viewpoint 41 and the view projection plane 42, as illustrated in FIG. 2a; such that the three-dimensional scene 43 has objects located on both sides of the view projection plane 42, as illustrated in FIG. 2b; or such that the three-dimensional scene 43 is located on the side of the view projection plane 42 facing away from the viewpoint 41, as illustrated in FIG. 2c. Parallel projection of the three-dimensional scene 43 rather than central projection is obtained by defining the viewpoint 41 of the camera at an infinite distance from the view plane 42. By mapping the two-dimensional image from the view projection plane 42 through the video controller 15 onto the two-dimensional display 3, a two-dimensional image 48 of the three-dimensional scene is displayed on display 3. Preferably, the functions of the 3D visualization module 11 are available through an application programming interface. For example, the 3D visualization module 11 includes program functions from OpenGL, by Silicon Graphics, Inc., or from Direct3D from Microsoft, Inc.

The animation module 12 is configured to animate automatically and in real-time the view of the three-dimensional scene 43 to provide to a user the view of the three-dimensional scene 43 with a kinetic depth effect. The view of the three-dimensional scene is animated by applying a transformation to the three-dimensional scene 43 or the camera. The transformation is a spatial transformation computing for each point of the three-dimensional scene 43, or the camera's view projection plane 42 and viewpoint 41, a new spatial location from a current spatial location. Preferably, the transformation is a linear transformation, specifically an affine transformation such as shearing or rotation, applied to the three-dimensional scene 43 or the camera in real-time. The linear transformation maps each point of an object, defined by a three-dimensional vector [a, b, c], through multiplication with a three-by-three transformation matrix onto a corresponding point of the transformed object, defined by a new three-dimensional vector [a', b', c']. One skilled in the art will understand that it is also possible to apply nonlinear transformations to the three-dimensional scene, for example a transformation such as rotation or shearing applied only to a defined limited spatial area surrounding the pointer. The animation module 12 is configured to apply a rotation and/or a shearing transformation to the three-dimensional scene 43 or the camera. For example, by means of parameter module 13, the transformation type can be selected by the user from a list of defined transformation types. By default, however, the shearing transformation is selected as the preferred transformation type. The animation module 12 is configured to apply the transformation to the three-dimensional scene 43 or the camera such that the projection (view) of the pointer 46 remains essentially static. For the rotation transformation, keeping the pointer projection 46 static is achieved by performing the rotation about a rotation axis running through a current location of the pointer 45 and being aligned essentially parallel to the view projection plane 42. For the shearing transformation, keeping the pointer projection 46 static is achieved by performing the shearing about a shearing plane p running through a current location of the pointer 45 and being aligned essentially parallel to the view projection plane 42.

The following paragraph shows an example of commented program code in C++ for animating automatically the view of the three-dimensional scene 43 by applying a rotation transformation to the three-dimensional scene 43. Essentially, the example shown uses four OpenGL function calls for obtaining the animation. In the presented example, applying a rotation transformation to the three-dimensional scene has the advantage that the same program code can be used for a perspective camera as well as for an orthogonal camera. In the example, the rotation has the effect that the three-dimensional scene is moved relative to the camera. In the example, the three-dimensional scene is pivoted back and forth about the current location of the pointer.

```
// amplitude for animation (swinging/pivoting angle)
float vAplitude = 5.0f;
// animation frequeny (swinging/pivoting speed)
```

-continued

```
float vFrequency = 0.5f;
// do the animation permanently
while (true) {
    // ***********************************************************
    // let the application clear the window and initialize the
    // projection (application executes it's own OpenGL code)
    //
    InitWindow( );
    // ***********************************************************
    // compute the transformation parameters (depending on the
    // application's time, cursor position, and camera orientation)
    //
    // get the current time from the application [seconds]
    float vTime = GetTime( );
    // compute the new angle (depending on time)
    float vAngle = vAplitude * sin(M_PI * vFrequency * vTime);
    // get the cursor position from the application
    float vCursorPositionX = GetCursorPositionX( );
    float vCursorPositionY = GetCursorPositionY( );
    float vCursorPositionZ = GetCursorPositionZ( );
    // get the camera upright direction from the application
    float vCameraDirectionUpX = GetCameraDirectionUpX( );
    float vCameraDirectionUpY = GetCameraDirectionUpY( );
    float vCameraDirectionUpZ = GetCameraDirectionUpZ( );
    // ***********************************************************
    // modify the transformation of the 3d-scene (THE animation core)
    //
    // activate the modelview matrix (OpenGL)
    // (matrix operations will affect the 3d-scene-transformation)
    glMatrixMode(GL_MODELVIEW);
    // translate 3d-scene (OpenGL)
    // (move cursor position into origin)
    glTranslatef(vCursorPositionX,
        vCursorPositionY,
        vCursorPositionZ);
    // rotate around the origin (OpenGL)
    // (use camera upright direction as rotation axis)
    glRotatef(vAngle, vCameraDirectionUpX,
            vCameraDirectionUpY,
            vCameraDirectionUpZ);
    // translate 3d-scene back (OpenGL)
    // (move cursor position to it's previous position)
    glTranslatef(-vCursorPositionX,
        -vCursorPositionY,
        -vCursorPositionZ);
    // ***********************************************************
    // let the application render the 3d-scene
    // (application executes it's own OpenGL code)
    //
    DrawWindow( );
}
```

Figure 3A:
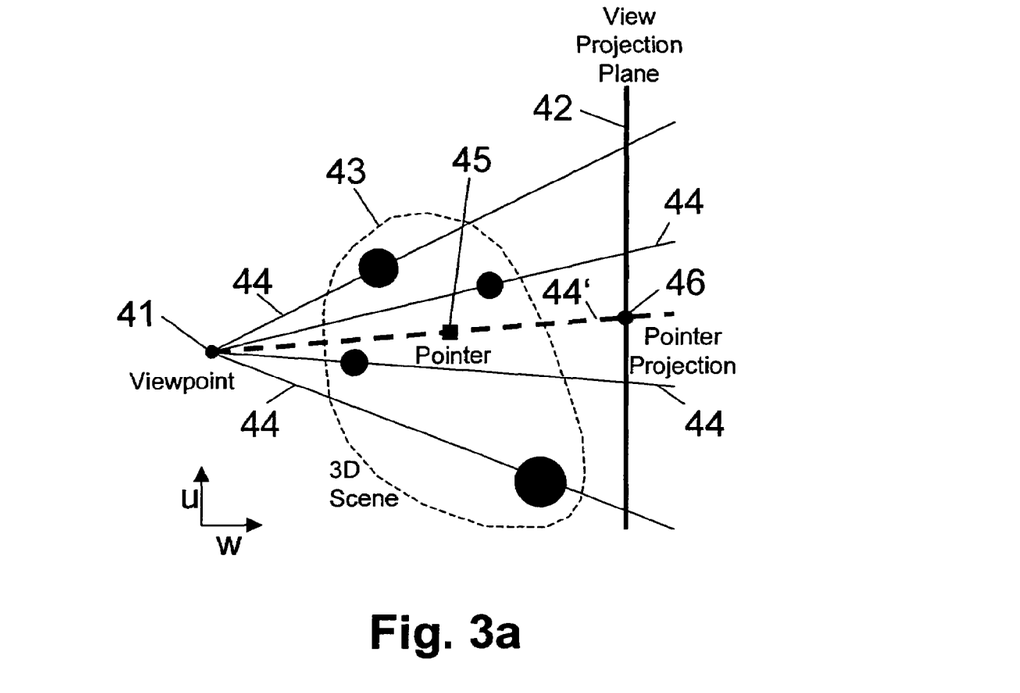
FIG. 3a shows a top view illustrating schematically the projection of a three-dimensional scene from a viewpoint onto a view projection plane, a pointer placed in the three-dimensional scene being projected as a pointer projection on the view projection plane.
Figure 3B:
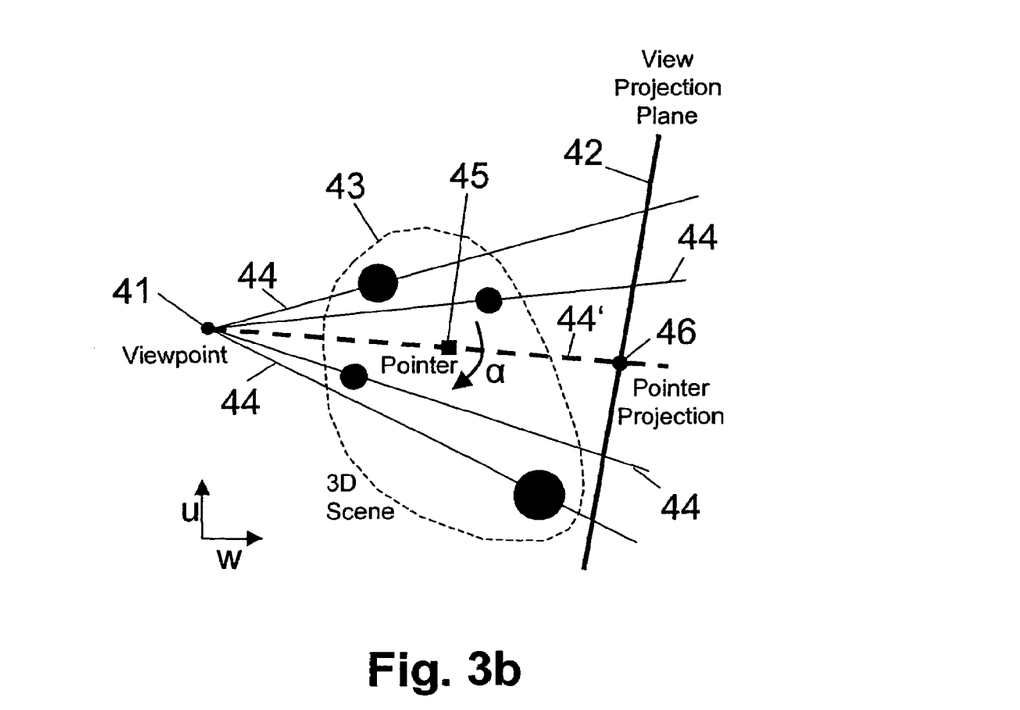
FIG. 3b shows a top view illustrating schematically the projection of the three-dimensional scene of FIG. 3a, wherein the positions of the viewpoint and the view projection plane are pivoted about the pointer.

As a result of a rotation transformation, the relative positioning of the camera and the three-dimensional scene 43 is changed. As is illustrated in FIGS. 3a and 3b, the viewpoint 41 and the view projection plane 42 are rotated around pointer (or cursor) 45 while the viewpoint 41 is kept fixed relative to the view projection plane 42. Because moving the three-dimensional scene 43 relative to the camera is equivalent to moving the camera relative to the three-dimensional scene 43, changing the positions of objects of the three-dimensional scene 43 relative to the viewpoint 41 and the view projection plane 42 is equivalent to changing the positions of the viewpoint 41 and the view projection plane 42 relative to the three-dimensional scene 43. The current position of the pointer 45 is determined continuously from the positioning values provided by driver 16. Thus, as a result of the rotation, the camera is pivoted about the current position of pointer 45 such that the location of the pointer projection 46, defined by the intersection of the projection line 44' running through the viewpoint 41 and the pointer 45, remains fixed on the view projection plane 42. As can be seen in FIG. 3b, caused by the rotation a of viewpoint 41 and view projection plane 42 around pointer

45, the projection of all other objects of the three-dimensional scene 43 onto the view projection plane 42 changes. In other words, when compared to FIG. 3*a*, the locations of the intersections of the projection lines 44 with the view projection plane 42 are moved in FIG. 3*b*.

To provide to the user on display 3 a view of the three-dimensional scene 43 with a kinetic depth effect, the animation module 12 is configured to animate automatically the view of the three-dimensional scene by applying continuously spatial transformations to the three-dimensional scene 43. A continuous animation of the projected and displayed view of the three-dimensional scene is achieved by repeating cyclically a series of rotation transformations with continuously changing transformation matrix. When applying a rotation transformation, the transformation matrix is continuously changed to produce an effect as if the camera (or the three-dimensional scene 43) was moved continuously with a defined movement. The defined movement is repeated cyclically and the current position of the pointer 45 is used as a defined fixed point. For example, as described earlier for the transformation type, the defined movement can be selected by the user from a list of defined movement types by means of parameter module 13. As is illustrated schematically in FIG. 7, examples of defined movements include movements of the camera in a u/v/w-coordinate system, moving the camera's viewpoint essentially in a (u/v) reference plane having the central projection line w* as a normal. Examples of defined movements include the circular movement A, the diagonal movement B, a movement in the shape of an "8" (not illustrated), the horizontal movement C, or the vertical movement D. The diagonal B, horizontal C, and vertical movements D include a movement from a starting point to an end point and from the end point back to the starting point. Applying transformations which correspond to moving the camera's viewpoint essentially in the reference plane causes the representation of the three-dimensional scene to appear in the two-dimensional display, as if the user moved his head parallel to the display screen to get an alternative look at the three-dimensional scene. Applying transformations which result in movement of the camera's viewpoint in the u-dimension (horizontal direction) corresponds to (horizontal) sideways movement of the head; movement of the camera's viewpoint in the v-dimension (vertical direction) corresponds to (vertical) nodding movement of the head; combined movement of the camera's viewpoint in the u- and v-dimension (horizontal and vertical directions) may correspond to circular movement of the head, for example. The parameter module 13 also provides a user interface to specify parameters for the different types of defined movements, for example the speed of the movement or a pivot angle $\phi$ (or a shearing amplitude S) of a pivoting movement. Without any user input, the animation module 12 uses default parameters stored in the computer 1'. Preferably, the cycle time (period) is in a range of 1 to 3 seconds. Preferably, the pivot angle is in the range of 2 to 10 degrees, such that the movement of the displayed three-dimensional objects is small relative to their respective size.

Figure 4:
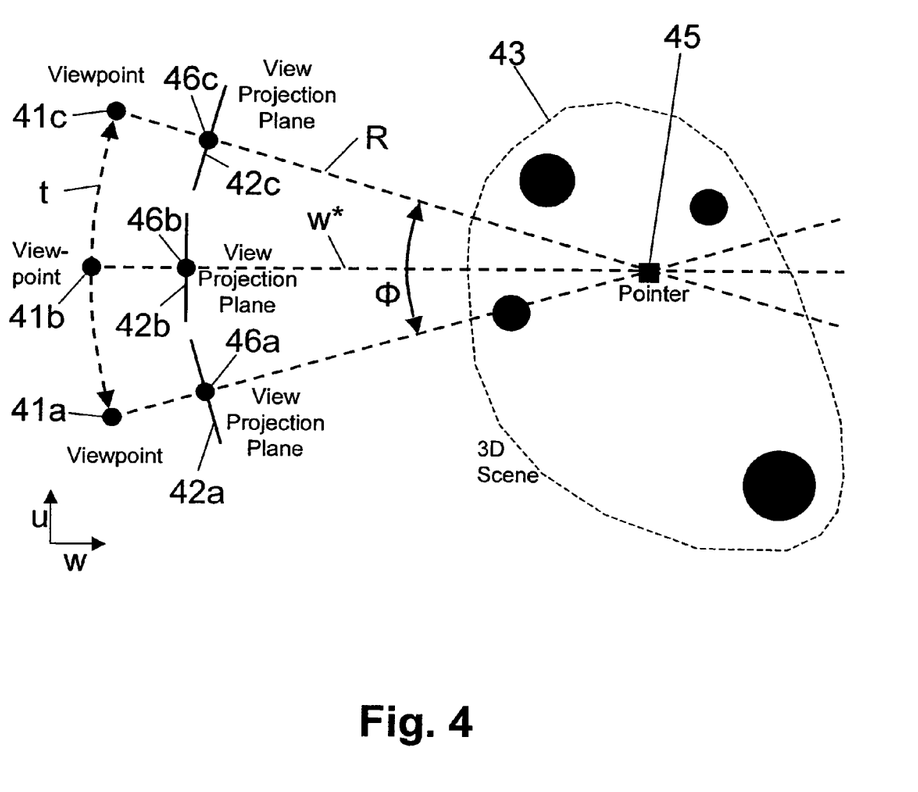
FIG. 4 shows a top view illustrating schematically the continuous change of the relative positions of the viewpoint and the view projection plane with respect to the three-dimensional scene, by pivoting the viewpoint and the view projection plane about the pointer.

As is illustrated in the example of FIG. 4, for a horizontal movement (in the u-dimension or x-dimension, respectively), the animation module 12 rotates the three dimensional scene 43 about a rotation axis running through the pointer 45 parallel to the view projection plane 42*a*, 42*b*, 42*c*. Alternatively, the camera can be rotated such that the viewpoint and the view projection plane move in a pivoting movement about the pointer 45. In the example shown in FIG. 4, the viewpoint is moved gradually and repeatedly (cyclically) along a trajectory t from an initial central viewpoint 41*b*, having the central projection line w*, to a first end viewpoint 41*a*; from the first end viewpoint 41*a* back to the central viewpoint 41*b*; from the central viewpoint 41*b* to a second end viewpoint 41*c*; and from the second end viewpoint 41*c* back to the central viewpoint 41*b*. The view projection plane 46*a*, 46*b*, 46*c* always remains fixed to the viewpoint 41*a*, 41*b*, 41*c*. This continuous back and forth sweeping movement of the camera (or a corresponding pivoting movement of the three dimensional scene) results in an animated view of the three-dimensional scene on the two-dimensional display 3, wherein the three-dimensional objects move continuously to the right and back to the left, the displayed view of the pointer 49 remaining fixed. Depending on the defined movement, the trajectory t is defined as a straight, curved, or circular line in the u/v reference plane. The trajectory t may also be defined with a radius R relative to pointer 45.

Figures 5A, 5B, 5C:
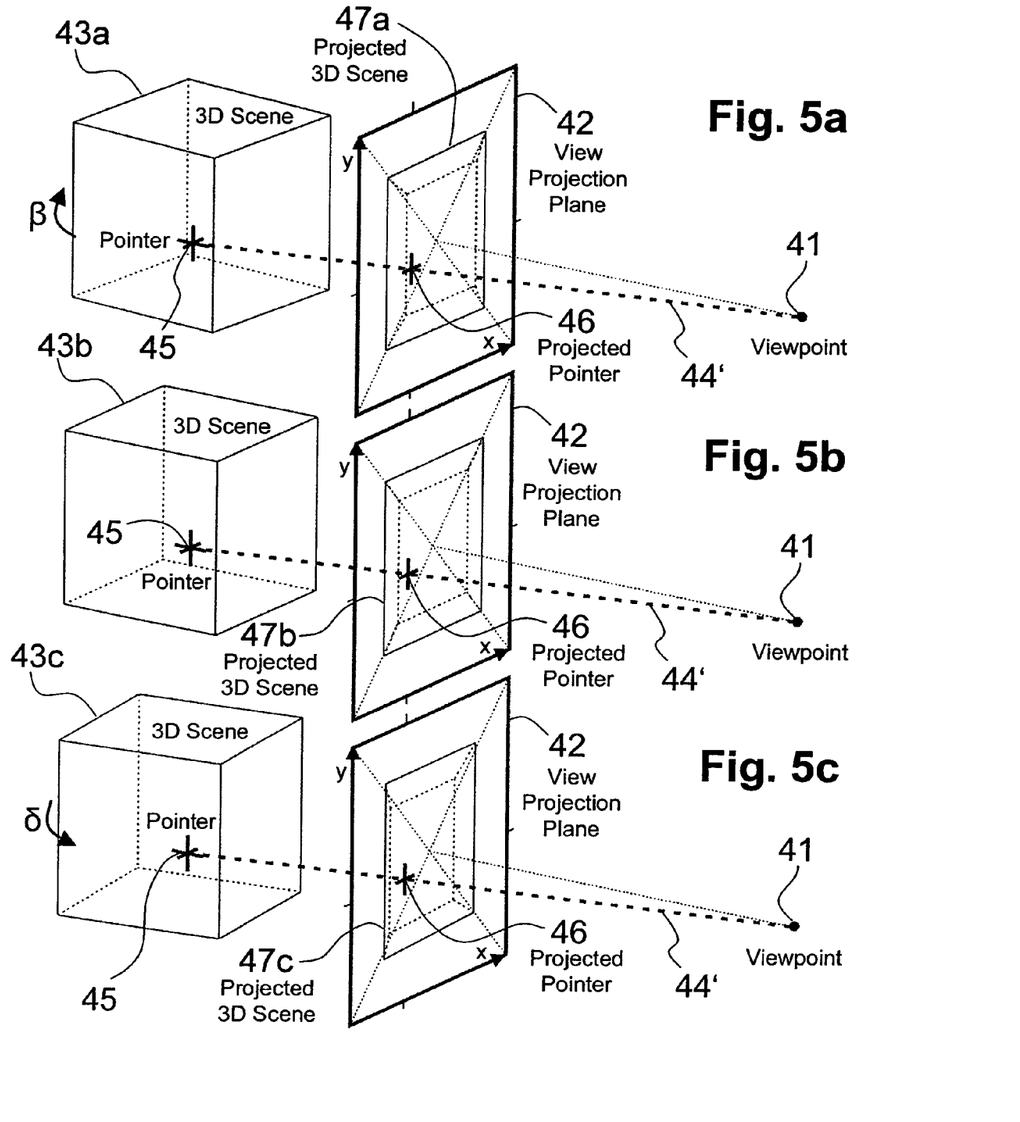
FIGS. 5a, 5b, and 5c show three-dimensional representations illustrating the projection of a three-dimensional scene from a viewpoint onto a view projection plane, wherein the relative positions of the viewpoint and view projection plane are changed with respect to the three-dimensional scene.

In FIG. 5*b*, the projected three-dimensional scene 47*b* of the three-dimensional scene 43*b* is shown on the projection plane 42 as viewed from viewpoint 41. Furthermore the projected pointer 46 of pointer 45 is shown on the projection plane 42 as viewed from viewpoint 41.

In FIG. 5*a*, the relative positions of the viewpoint 41 and view projection plane 42 are changed with respect to the three-dimensional scene. In the example of FIG. 5*a*, the change of the relative positioning is obtained as a result of the rotation $\beta$ of the three-dimensional scene 43*a* around pointer 45. However, the change of the relative positioning can also be obtained by rotating the camera around pointer 45. As can be seen in FIG. 5*a*, the projected three-dimensional scene 47*a* is different from the projected three-dimensional scene 47*b* shown in FIG. 5*b*. The projected three-dimensional scene 47*a* appears as if viewed from a viewpoint located more to the right than the viewpoint in FIG. 5*b*.

In FIG. 5*c*, the change of relative positions of the viewpoint 41 and view projection plane 42 with respect to the three-dimensional scene is obtained as a result of the rotation $\delta$ of the three-dimensional scene 43*c* around pointer 45. Again, the change of the relative positioning can also be obtained by rotating the camera around pointer 45. As can be seen in FIG. 5*c*, the projected three-dimensional scene 47*c* is different from the projected three-dimensional scenes 47*a*, 47*b* shown in FIG. 5*a* or 5*b*, respectively. The projected three-dimensional scene 47*c* appears as if viewed from a viewpoint located more to the left than the viewpoints in FIGS. 5*a* and 5*b*.

Figure 6A:
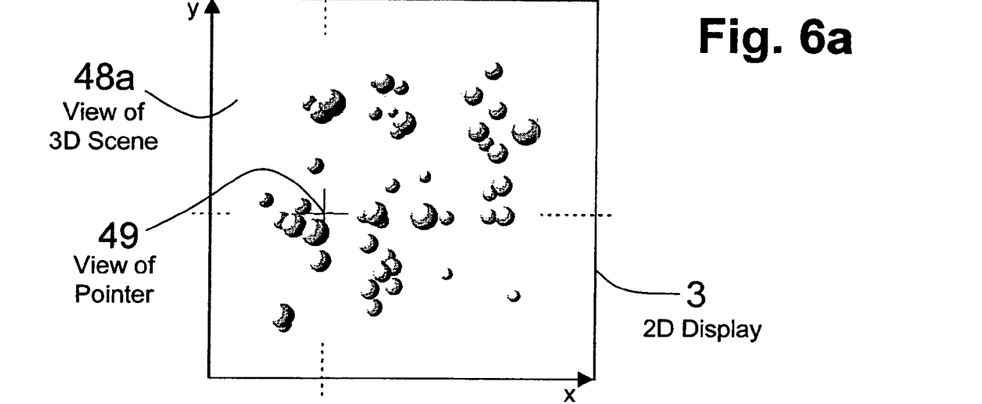
FIGS. 6a, 6b, and 6c each show the two-dimensional display showing the three-dimensional scene at a different phase of the animated view.
Figure 6B:
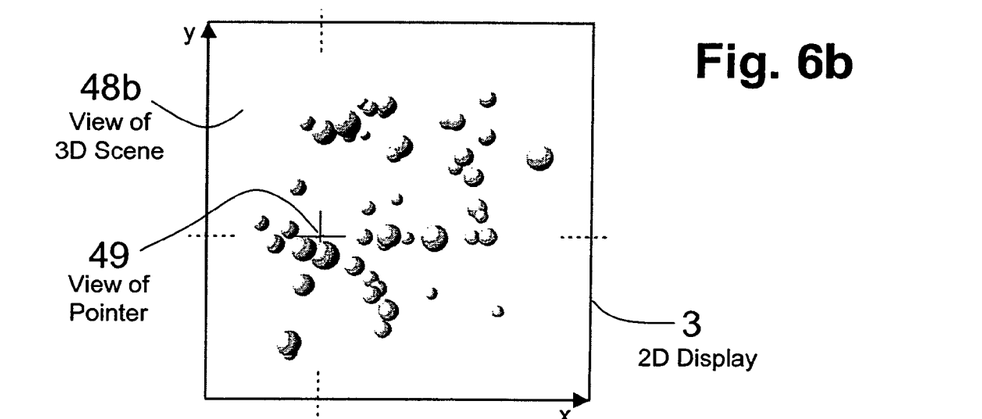
Figure 6C:
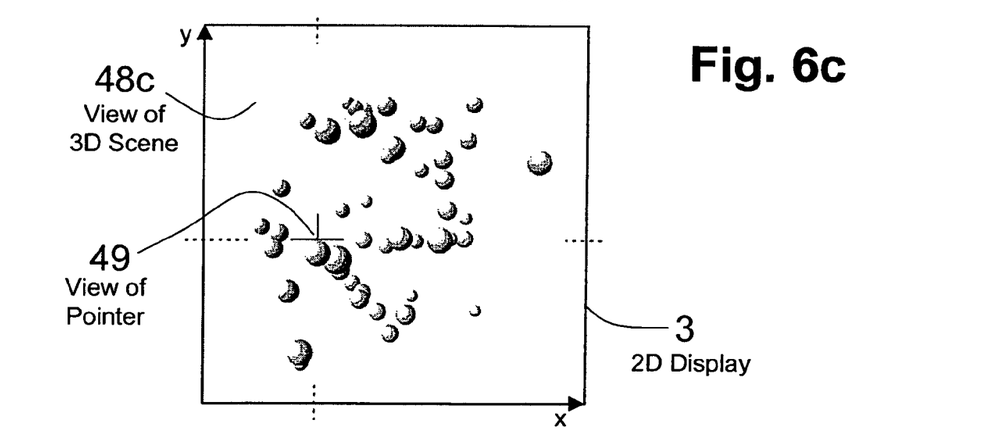

In FIG. 6*a*, the two-dimensional display 3 is illustrated displaying a view of the three-dimensional scene 48*a* and a view of the pointer 49. The displayed view of the three-dimensional scene 48*a* corresponds to the projected three-dimensional scene 47*a* of FIG. 5*a*. For example, the displayed view of the three-dimensional scene 48*a* corresponds to a view of the three-dimensional scene from a camera configuration with the first end viewpoint 41*a* of FIG. 4. As the camera is moved along the trajectory t of FIG. 4, the perspective view of the three-dimensional scene shown on display 3 changes gradually. As the camera reaches the configuration with the central viewpoint 41*b* of FIG. 4, the display 3 shows the three-dimensional scene 48*b* and a view of pointer 49 as illustrated in FIG. 6*b*. The displayed view of the three-dimensional scene 48*b* corresponds to the projected three-dimensional scene 47*b* of FIG. 5*b*. The camera is moved further along the trajectory t of FIG. 4 and the perspective view of the three-dimensional scene shown on display 3 keeps changing gradually. As the camera reaches the configuration with the second end viewpoint 41c of FIG. 4, the display 3 shows the three-dimensional scene 48c and a view of the pointer 49 as illustrated in FIG. 6c. The displayed view of the three-dimensional scene 48c corresponds to the projected three-dimensional scene 47c of FIG. 5c. This animation of the view of the three-dimensional scene is continued as the camera is moved back on the trajectory t of FIG. 4, from the second end viewpoint 41c through the center viewpoint 41b back to the first end viewpoint 41a. Thereafter, the cycle can be repeated again. Alternatively, the three-dimensional scene is rotated accordingly to obtain the same animated view of the three-dimensional scene on display 3.

Figure 8:
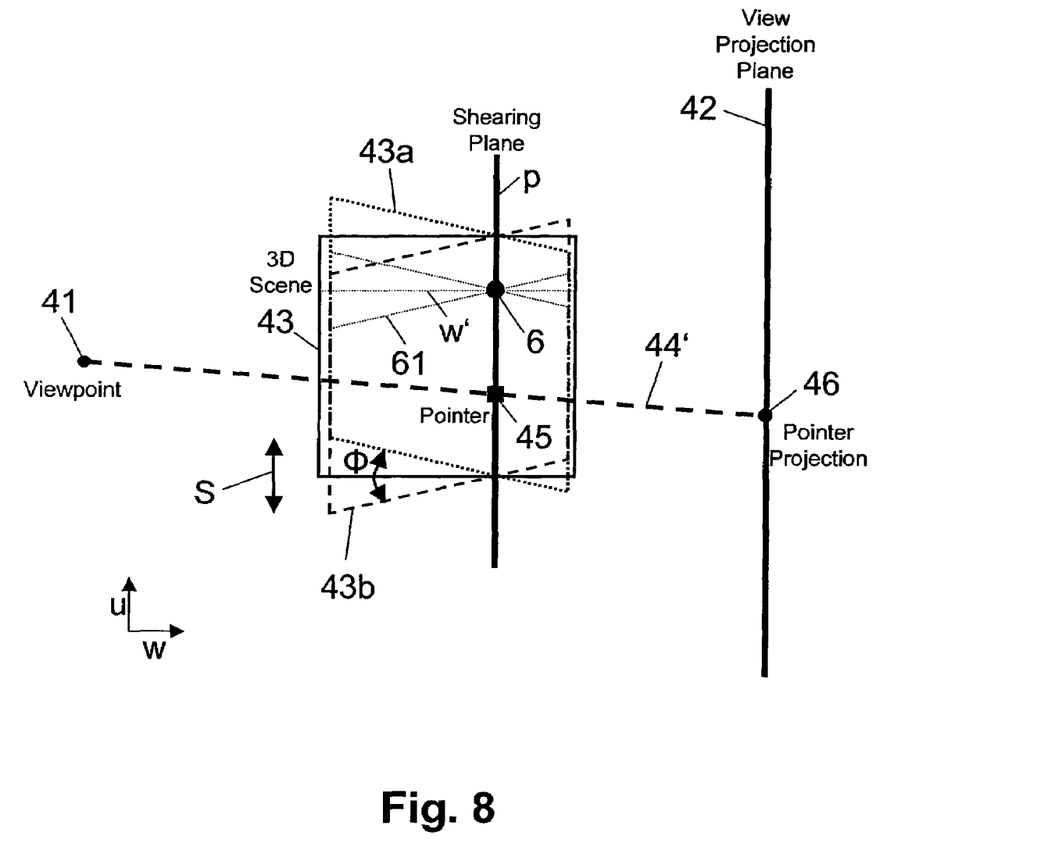
FIG. 8 shows a top view illustrating schematically the continuous change of the three-dimensional scene resulting from a shearing transformation applied to the three-dimensional scene.

FIG. 8 illustrates a shearing transformation as the preferred spatial transformation applied to the three-dimensional scene 43 for animating automatically in real-time the view of the three-dimensional scene 48b. The shearing operation is performed about the shearing plane p, which is running through the pointer 45 parallel to the view projection plane 42. As is illustrated in the top view of FIG. 8, the shearing operation is applied with a maximum shearing amplitude S, defined as the distance between the three-dimensional scenes 43a and 43b having the most extreme deformations as a result of the shearing transformation. A continuous animation of the projected and displayed view of the three-dimensional scene is achieved by repeating cyclically a series of shearing transformations with continuously changing transformation matrix. As illustrated in FIG. 8, a cycle starts with the initial undeformed three-dimensional scene 43; from there, the shearing transformation is applied continuously in small increments of the shearing amplitude until the shearing transformation results in the transformed three-dimensional scene 43a; thereafter, the shearing transformation is applied continuously in small decrements of the shearing amplitude until the shearing transformation results in the transformed three-dimensional scene 43b; finally, the cycle is completed by applying the shearing transformation continuously in small increments of the shearing amplitude until the shearing transformation results in the initial undeformed three-dimensional scene 43. Through the continuous shearing of the three-dimensional scene, the perspective view of the three-dimensional scene shown on display 3, as projected from viewpoint 41 onto the view projection plane 42, changes gradually. Applying the shearing transformation within the full range of the shearing amplitude S corresponds to applying the shearing transformation within the pivot angle φ shown in FIG. 8. One skilled in the art will understand that animating the view of the three-dimensional scene through a shearing transformation can be obtained alternatively by corresponding shearing of the camera, specifically, by shearing viewpoint and view projection plane of a parallel projection camera.

As was described above with reference to FIG. 7, not only a transformation type but also a movement type can be selected by the user by means of parameter module 13. According to the selected movement type, the animation module 12 animates automatically the view of the three-dimensional scene to provide to the user a view of the three-dimensional scene 43 with a kinetic depth effect.

Figure 9:
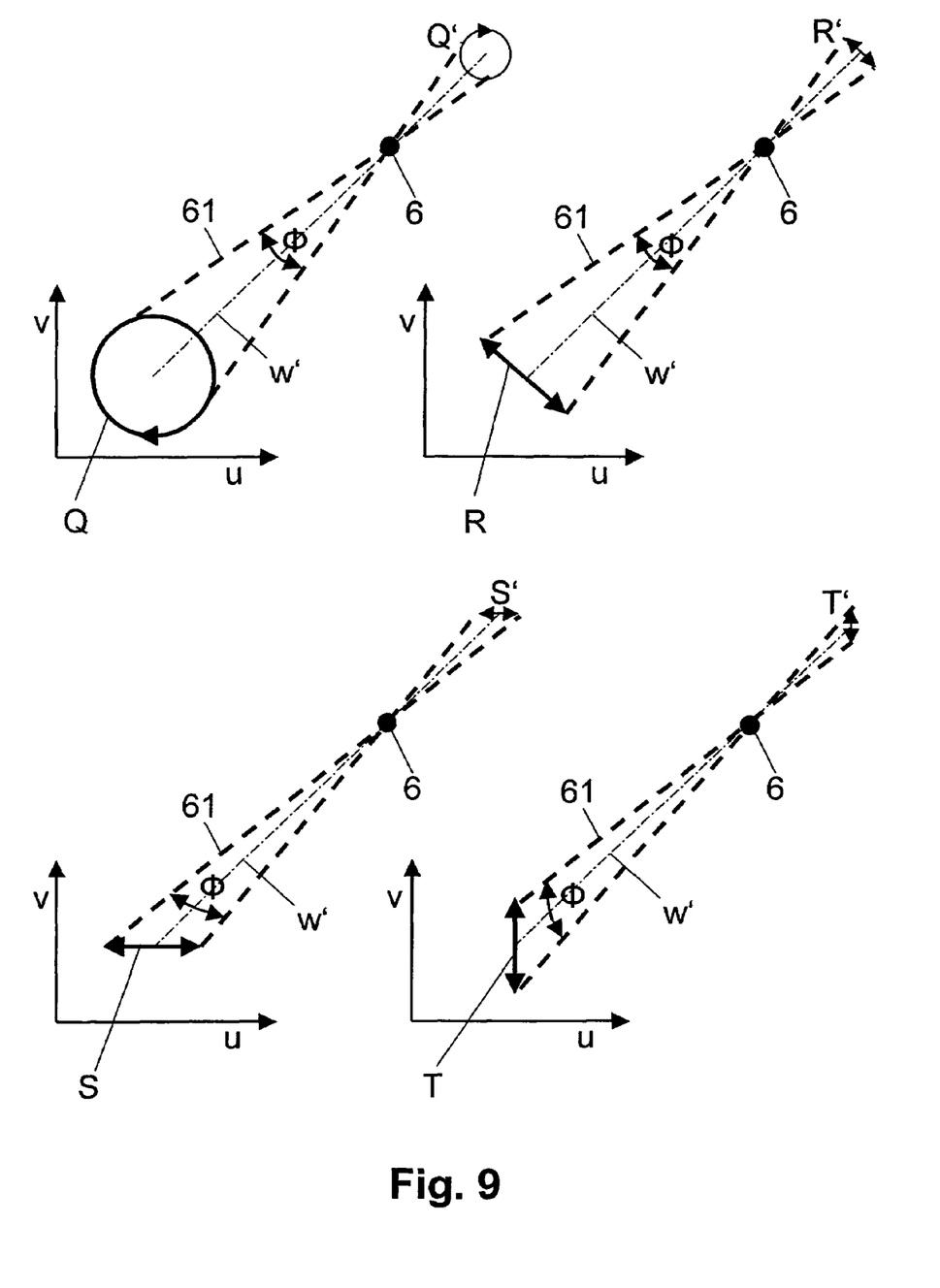
FIG. 9 shows three-dimensional representations illustrating schematically different types of movements for animating the view of the three-dimensional scene.

When applying a shearing transformation, the transformation matrix is continuously changed to produce an effect as if the three-dimensional scene 43 (or the camera) was sheared with a defined movement. The defined movement of the shearing transformation is repeated cyclically while the shearing plane p 45 is kept fixed. In FIG. 9, to illustrate different types of movements for the shearing transformation, shown is the movement of points of the three dimensional scene 43 located on an axis 61 running through a fixed point 6 in the shearing plane p. Reference numeral w' refers to a normal to the shearing plane p running through fixed point 6. As is illustrated schematically in FIG. 9, the points on axis 61 are moved through the shearing transformations such that intersections of the axis 61 with a u/v-reference plane parallel to the shearing plane p define movements such as the circular movement Q (circular movement Q' in reverse direction), the diagonal movement R (diagonal movement R' in reverse direction), a movement in the shape of an "8" (not illustrated), the horizontal movement S (horizontal movement S' in reverse direction), or the vertical movement T (vertical movement T' in reverse direction). As a result of these shearing transformations, the representation of the three-dimensional scene appears in the two-dimensional display, as if the user moved his head parallel to the display screen to get an alternative look at the three-dimensional scene. Applying transformations which result in movement of the intersections in the u-dimension (horizontal direction) corresponds to (horizontal) sideways movement of the head; movement of the intersections in the v-dimension (vertical direction) corresponds to (vertical) nodding movement of the head; combined movement of the intersections in the u- and v-dimension (horizontal and vertical directions) may correspond to circular movement of the head, for example.

Figure 7:
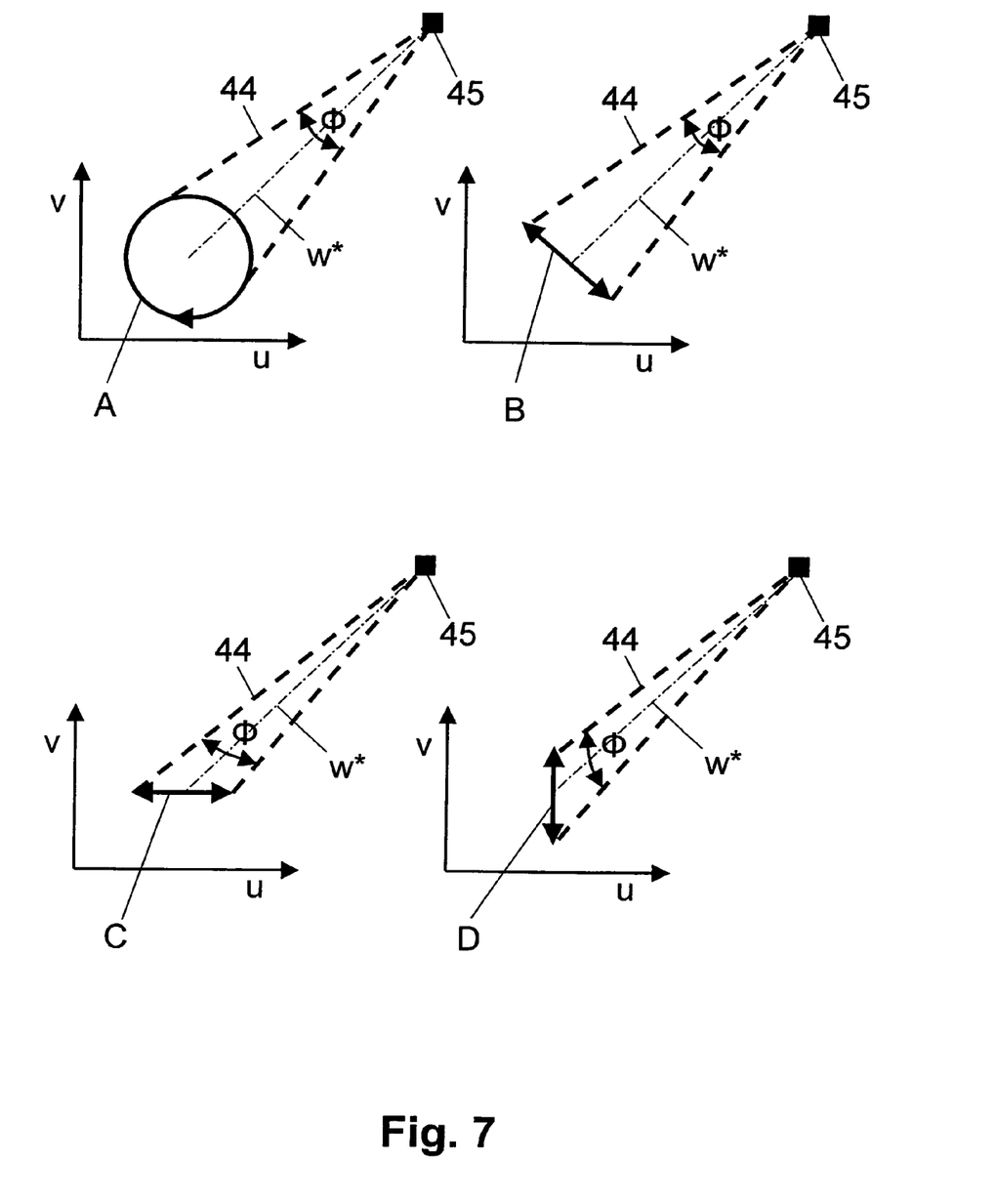
FIG. 7 shows three-dimensional representations illustrating schematically different types of movements for animating the view of the three-dimensional scene.

For the rotation transformation as well as the shearing transformation, the preferred (default) movement for animating continuously and automatically the view of the tree-dimensional scene in real-time is a back-and-forth pivoting movement about the current location of the pointer, corresponding to the horizontal movement C, described with reference to FIG. 7, or the horizontal movement S, described with reference to FIG. 9, respectively.

The following paragraph shows an example of commented program code using OpenGL function calls for animating automatically the view of the three-dimensional scene 43 by applying a shearing transformation to the three-dimensional scene 43.

```
// amplitude for animation (swinging/pivoting angle)
float vAplitude = 5.0f;
// animation frequeny (swinging/pivoting speed)
float vFrequency = 0.5f;
// do the animation permanently
while (true) {
    // *********************************************************
    // let the application clear the window and initialize the
    // projection (application executes it's own OpenGL code)
    //
    InitWindow( );
    // *********************************************************
    // compute the transformation parameters (depending on the
    // application's time, cursor position, and camera orientation)
    //
    // get the current time from the application [seconds]
    float vTime = GetTime( );
    // compute the new angle (depending on time)
    float vAngle = vAplitude * sin(M_PI * vFrequency * vTime);
    // get the cursor position from the application
    float vCursorPositionX = GetCursorPositionX( );
    float vCursorPositionY = GetCursorPositionY( );
    float vCursorPositionZ = GetCursorPositionZ( );
    // get the camera orientation from the application (4x4-matrix)
    float vCameraOrientation[4*4];
    GetCameraOrientation(vCameraOrientation);
    // compute the inverse matrix of camera orientation
    float vCameraOrientationInverse[4*4];
```

-continued

```
Inverse(vCameraOrientation, vCameraOrientationInverse);
// set up the shear matrix
float vShearMatrix[4*4];
Identity(vShearMatrix);
// modify matrix element (i=0, j=2)
// => shearing in x direction along the xy-plane
vShearMatrix [8] = tan(M_PI * vAngle / 180.0f);
// ***************************************************
// modify the transformation of the 3d-scene (THE animation core)
//
// activate the modelview matrix (OpenGL)
// (matrix operations will affect the 3d-scene-transformation)
glMatrixMode(GL_MODELVIEW);
// translate 3d-scene (OpenGL)
// (move cursor position into origin)
glTranslatef(vCursorPositionX,
        vCursorPositionY,
        vCursorPositionZ);
// rotate the 3d-scene (OpenGL)
// (align the orientation of the 3d-scene with the camera)
glMultMatrixf(vCameraOrientationInverse);
// execute the shearing (OpenGL)
// (shear along the xy-plane in x-direction)
glMultMatrixf(vShearMatrix);
// rotate the 3d-scene back (OpenGL)
// (restore the previous orientation)
glMultMatrixf(vCameraOrientation);
// translate 3d-scene back (OpenGL)
// (move cursor position to it's previous position)
glTranslatef(-vCursorPositionX,
        -vCursorPositionY,
        -vCursorPositionZ);
// ***************************************************
// let the application render the 3d-scene
// (application executes it's own OpenGL code)
//
DrawWindow( );
    }
```

The invention claimed is:

1. A computerized method of positioning in a visualization system a pointer in a three-dimensional scene, the method comprising:
showing a view of the three-dimensional scene on a two-dimensional display as projected onto a camera's view projection plane from a defined viewpoint of the camera, the view of the three-dimensional scene including a view of the pointer as projected onto the view projection plane from the viewpoint;
animating automatically the view of the three-dimensional scene, by applying a transformation to the three-dimensional scene or the camera, to provide to a user the view of the three-dimensional scene with a kinetic depth effect, the transformation being selected by the user from a plurality of transformations;
receiving from the user, while animating the view, signals for generating positioning values for three dimensions; and
in response to the signals, positioning the pointer in the three-dimensional scene based on the positioning values while animating the view,
wherein the animating the view includes the applying the transformation so that the view of the pointer does essentially not move as a result of the transformation.

2. The method according to claim 1, wherein the transformation includes one of rotation and shearing, the rotation being performed about an axis running through a current location of the pointer, and the shearing being performed about a plane running through the current location of the pointer.

3. The method according to claim 1, wherein the view of the three-dimensional scene is animated continuously in a defined movement with cyclic repetition.

4. The method according to claim 1, wherein the view of the three-dimensional scene is animated continuously in a back-and-forth pivoting movement about a current location of the pointer at a defined speed and with a defined pivot angle.

5. The method according to claim 1,
wherein a pointer projection defined by an intersection of a projection line with the view projection plane is kept fixed, and wherein the projection line runs through the viewpoint and a current location of the pointer.

6. The method according to claim 1, wherein parameters of the transformation are selected by the user, wherein the parameters include at least one of a speed of the transformation or a pivot angle of the transformation.

7. A computerized visualization system configured to position a pointer in a three-dimensional scene, the system comprising:
means for showing on a two-dimensional display a view of the three-dimensional scene, as projected onto a camera's view projection plane from a defined viewpoint of the camera, the view of the three-dimensional scene including a view of the pointer as projected onto the view projection plane from the viewpoint;
means for animating automatically the view of the three-dimensional scene, by applying a transformation to the three-dimensional scene or the camera, to provide to a user the view of the three-dimensional scene with a kinetic depth effect, the transformation being selected by the user from a plurality of transformations;
means for receiving from the user, while animating the view, signals for generating positioning values for three dimensions; and
means for positioning the pointer in the three-dimensional scene, in response to the signals, based on the positioning values while animating the view,
wherein the means for animating the view being configured to apply the transformation such that the view of the pointer does essentially not move as a result of the transformation.

8. The system according to claim 7, wherein the means for animating the view are configured to apply one of rotation and shearing as the transformation; and wherein the means for animating the view are configured to perform the rotation about an axis running through a current location of the pointer and to perform the shearing about a plane running through the current location of the pointer.

9. The system according to claim 7, wherein the means for animating the view are configured to animate continuously the view of the three-dimensional scene in a defined movement with cyclic repetition.

10. The system according to claim 7, wherein the means for animating the view are configured to animate continuously the view of the three-dimensional scene in a back-and-forth pivoting movement about a current location of the pointer at a defined speed and with a defined pivot angle.

11. The system according to claim 7,
wherein the means for animating the view is configured to apply the transformation such that a pointer projection defined by an intersection of a projection line with the view projection plane is kept fixed, and
wherein the projection line runs through the viewpoint and a current location of the power.

12. The system according to claim 7, wherein parameters of the transformation are selected by the user, wherein the parameters include at least one of a speed of the transformation or a pivot angle of the transformation.

13. A storage medium storing a computer program for controlling one or more processors of a computerized visualization system, configured to show on a two-dimensional display a view of a three-dimensional scene, the program comprising:
   instructions for positioning a pointer in the three-dimensional scene, the view of the three-dimensional scene shown on the two-dimensional display being projected onto a camera's view projection plane from a defined viewpoint of the camera, the view of the three-dimensional scene including a view of the pointer as projected onto the view projection plane from the viewpoint;
   instructions for animating automatically the view of the three-dimensional scene, by applying the transformation to the three-dimensional scene or the camera, to provide to a user the view of the three-dimensional scene with a kinetic depth effect, the transformation being selected by the user from a plurality of transformations;
   instructions for receiving from the user, while animating the view, signals for generating positioning values for three dimensions; and
   instructions for positioning the pointer, in response to the signals, based on the positioning values, while animating the view,
   wherein the instructions for animating includes the applying the transformation to the three-dimensional scene or the camera, the transformation being applied such that a view of the pointer does essentially not move as a result of the transformation.

14. The computer program according to claim 13, further comprising:
   instructions for 0animating the view of the three-dimensional scene by applying one of rotation and shearing as the selected transformation,
   wherein the rotation is about an axis running through a current location of the pointer, and
   wherein the shearing is about a plane running through the current location of the pointer.

15. The computer program according to claim 13, further comprising instructions for animating continuously the view of the three-dimensional scene in a defined movement with cyclic repetition.

16. The computer program according to claim 13, further comprising instructions for animating continuously the view of the three-dimensional scene in a back-and-forth pivoting movement about a current location of the pointer at a defined speed and with a defined pivot angle.

17. The computer program according to claim 13, wherein parameters of the transformation are selected by the user, wherein the parameters include at least one of a speed of the transformation or a pivot angle of the transformation.

18. A computerized method of positioning in a visualization system a pointer in a three-dimensional scene, the method comprising:
   showing a view of the three-dimensional scene on a two-dimensional display as projected onto a camera's view projection plane from a defined viewpoint of the camera, the view of the three-dimensional scene including a view of the pointer as projected onto the view projection plane from the viewpoint;
   animating automatically the view of the three-dimensional scene, by applying a transformation to the three-dimensional scene or the camera, to provide to a user the view of the three-dimensional scene with a kinetic depth effect, the transformation being selected by the user from a plurality of transformations, the transformation including one of rotation and shearing;
   receiving from the user, while animating the view, signals for generating positioning values of three dimensions; and
   in response to the signals, positioning the pointer in the three-dimensional scene based on the positioning values while animating the view,
   wherein the animating the view includes one of performing the rotation about an axis running through a current location of the pointer and performing the shearing about a plane running through the current location of the pointer such that the view of the pointer does essentially not move as a result of the transformation.

19. The method according to claim 18, wherein parameters of the transformation are selected by the user, wherein the parameters include at least one of a speed of the transformation or a pivot angle of the transformation.

20. A computerized visualization system configured to position a pointer in a three-dimensional scene, the system comprising:
   means for showing on a two-dimensional display a view the three-dimensional scene, as projected onto a camera's view projection plane from a defined viewpoint of the camera, the view of the three-dimensional scene including a view of the pointer as projected onto the view projection plane from the viewpoint;
   means for animating automatically the view of the three-dimensional scene, by applying a transformation to the three-dimensional scene or the camera, to provide to a user the view of the three-dimensional scene with a kinetic depth effect, the transformation being selected by the user from a plurality of transformations, the transformation including one of rotation and shearing;
   means for receiving from the user, while animating the view, signals for generating positioning values for three dimensions, and
   means for positioning the pointer in the three-dimensional scene, in response to the signals, based on the positioning values while animating the view, the means for animating the view being configured to perform the rotation about an axis running through a current location of the pointer or to perform the shearing about a plane running through the current location of the pointer such that the view of the pointer does essentially not move as a result of the transformation.

21. The method according to claim 20, wherein parameters of the transformation are selected by the user, wherein the parameters include at least one of a speed of the transformation or a pivot angle of the transformation.

* * * * *